(12) United States Patent
Valdivia y Alvarado et al.

(10) Patent No.: US 7,865,268 B2
(45) Date of Patent: Jan. 4, 2011

(54) MECHANICAL FISH ROBOT EXPLOITING VIBRATION MODES FOR LOCOMOTION

(75) Inventors: Pablo Valdivia y Alvarado, Cambridge, MA (US); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 912 days.

(21) Appl. No.: 11/159,945

(22) Filed: Jun. 23, 2005

(65) Prior Publication Data
US 2006/0000137 A1    Jan. 5, 2006

Related U.S. Application Data

(60) Provisional application No. 60/582,566, filed on Jun. 24, 2004.

(51) Int. Cl.
*G06F 19/00* (2006.01)
*A63H 23/00* (2006.01)
*B32B 9/04* (2006.01)
*B63G 8/18* (2006.01)

(52) U.S. Cl. .................. 700/245; 114/332; 446/158; 428/411.1

(58) Field of Classification Search ............. 114/332; 428/411.1; 446/158
See application file for complete search history.

(56) References Cited

U.S. PATENT DOCUMENTS

| 3,783,552 | A | * | 1/1974 | Goldbach | 446/158 |
| 3,785,084 | A | * | 1/1974 | Aenishanslin | 446/158 |
| 4,135,326 | A | * | 1/1979 | Tong | 446/158 |
| 4,687,456 | A | * | 8/1987 | Wang | 446/158 |
| 4,713,037 | A | * | 12/1987 | Tong | 446/158 |

(Continued)

OTHER PUBLICATIONS

Review of Fish swimming modes for aquatic locomotion, IEEE Journal of Oceanic Engineering, vol. 24, No. 2, Apr. 1999.*

(Continued)

*Primary Examiner*—Khoi Tran
*Assistant Examiner*—Ian Jen
(74) *Attorney, Agent, or Firm*—Steven J. Weissburg

(57) ABSTRACT

Compliant mechanisms whose dominant modes of vibration match the desired kinematics for locomotion in a given environment are used to mimic motions of a living animal. Mechanisms are simple and mechanically robust. They may have as few as one actuator, which excites the compliant portion to vibrate in a natural mode that results in motion that mimics a living animal. Additional actuators may drive directional elements such as flippers. Models for compliant mechanism bodies were derived and used to identify actuator, material, and geometrical properties of the required mechanisms. The design and fabrication techniques of mechanisms implementing these ideas is also presented. Experiments found that important features of fish-swimming kinematics can be captured qualitatively by compliant mechanisms. The resulting mechanism swimming performance was ⅓ of the real fish performance, comparable to current robotic fish. A compliant mechanism approach to biomimetic locomotion has significant advantages since mechanisms are simpler and more robust than traditional mechanisms used for biomimetic robots and performance achieved is comparable. Radio control is straightforward. The flexible material may be uniform, but need not be. Active materials, such as piezoelectric materials may be used to change the stiffness or other mechanical properties of the flexible portion. The material may be distributed uniformly or non-uniformly. The tail portion may be tapered or uniform or variable cross-section.

48 Claims, 9 Drawing Sheets

U.S. PATENT DOCUMENTS

| | | | | |
|---|---|---|---|---|
| 4,832,650 | A * | 5/1989 | Tong | 446/156 |
| 5,463,826 | A * | 11/1995 | Horiuchi | 40/426 |
| 5,891,577 | A * | 4/1999 | Breitbach et al. | 428/411.1 |
| 6,138,604 | A * | 10/2000 | Anderson et al. | 114/332 |
| 6,619,146 | B2 * | 9/2003 | Kerrebrock | 74/25 |
| 6,814,634 | B2 * | 11/2004 | Roberts | 440/38 |
| 6,923,693 | B2 * | 8/2005 | Borgen et al. | 440/15 |
| 7,244,151 | B2 * | 7/2007 | Gusler | 440/13 |
| 2005/0163684 | A1 * | 7/2005 | Sherr | 422/265 |
| 2006/0196104 | A1 * | 9/2006 | Lapointe | 43/42.24 |

OTHER PUBLICATIONS

The Optimal Control of a Flexible Hull Robotic Undersea Vehicle propelled by an oscillating Foil, 1996 IEEE, 0-78-3-3-3185-9/96.*

The Optimal Control of a Flexible Hull Robotic undersea vehicle propelled by a oscillating foil—1996 IEEE.*

Review of Fish Swimming Modes for Aquatic Locomotion; 1999 IEEE.*

Abrate, Serge, "Vibration of Non-uniform Rods and Beams", Journal of Sound and Vibration, 1995, vol. 185(4), pp. 703-716.

Anderson, Jamie Marie, "Vorticity Control for Efficient Propulsion", Ph.D. Thesis, Massachusetts Institute of Technology and Woods Hole Oceanographic Institution, Feb. 1996, Sections 3.7-3.9.

Barrett, David Scott, "Propulsive Efficiency of a Flexible Hull Underwater Vehicle", Ph.D. Thesis, Massachusetts Institute of Technology, May 1996, Sections 1.2, 3.2.

Blickhan, R. and Cheng, J., "Energy Storage by Elastic Mechanisms in the Tail of Large Swimmers—a Re-evaluation", Journal of Theoretical Biology, 1994, vol. 168, pp. 315-321.

Cham, J., Pruitt, B., Cutkosky, M., Binnard, M., Weiss, L. and Neplotnik, G., "Layered Manufacturing with Embedded Components: Process Planning Considerations", Proceedings of DETC99, 1999 ASME Design Engineering Technical Conference, Sep. 12-14, 1999, Las Vegas, Nevada, pp. 1-9.

Gottlieb, H. P. W., "Comments on Vibrations of Non-Uniform Beams and Rods", Journal of Sound and Vibration, 1996, vol. 195(1), pp. 139-141.

Harper, K., Berkemeier, M. and Grace, S., "Decreasing the Energy Costs of Swimming Robots through Passive Elastic Elements", Proceeding of the 1997 IEEE International Conference on Robotics and Automation, Albuquerque, New Mexico, Apr. 1997, pp. 1839-1844.

Kumph, John Muir, "The Design of a Free Swimming Robot Pike", B.S. Thesis, Massachusetts Institute of Technology, May 1996, pp. 39-64.

Lighthill, Sir James, Mathematical Biofluidynamics, Society for Industrial and Applied Mathematics, 1975, p. 66-93.

McLetchie, K.M., "Drag Reduction of an Elastic Fish Model", B.S. Thesis, Massachusetts Institute of Technology, 2002, pp. 1-63.

Timoshenko, S., Young, D. H. and Weaver, Jr., W., Vibration Problems in Engineering, Fourth Edition, John Wiley & Sons, New York, 1974, pp. 415-441.

Videler, John J., Fish Swimming, Chapman & Hall, London, 1993, Fish and Fisheries Series 10, Chapter 6, pp. 113-137.

Web Page Berkeley Robotic Laboratory, http://bleex.me.berkeley.edu/calibot.htm as of Sep. 19, 2005.

* cited by examiner

FOR FIGS. 7A-C
- - - - MODEL OF LIVING FISH
—— MODEL OF ROBOT FISH
—— PROTOTYPE ROBOT

US 7,865,268 B2

MECHANICAL FISH ROBOT EXPLOITING VIBRATION MODES FOR LOCOMOTION

RELATED DOCUMENT

Priority is hereby claimed to Provisional U.S. Patent Application Ser. No. 60/582,566, filed on Jun. 24, 2004, the entirety of which is hereby incorporated by reference.

A partial summary is provided below, preceding the claims.

The inventions disclosed herein will be understood with regard to the following description, appended claims and accompanying drawings, where:

NOMENCLATURE

Figure 1:
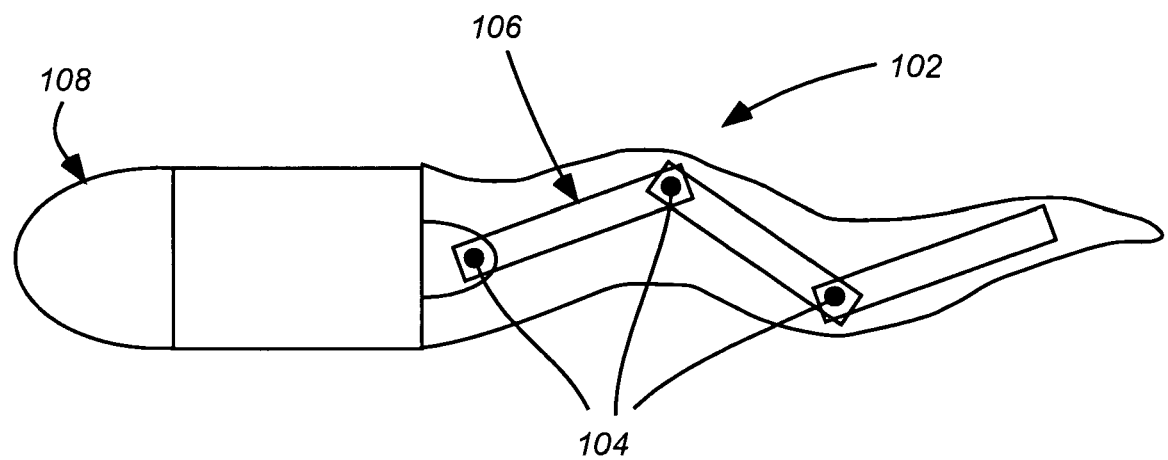
FIG. 1 is a schematic representation of a prior art fish robot mechanism having a plurality of discrete actuators and links.

The following symbols and abbreviations are used herein.
For a Swimming Fish Model:
$y_b$: Lateral displacement of fish body.
$x_b$: Distance along body from fish nose.
$c_1$: Linear wave amplitude envelope
$c_2$: Quadratic wave amplitude envelope
K: Body wave number
$\omega$: Body wave frequency t: Time.
For a Compliant Robot Mechanism Model:
y: Lateral displacement of tail.
x: Distance along body from tail base.
$l_r$: Length of rigid section.
l: Length of flexible section.
r: Half thickness of body (not used in derivations but shown on graph).
M: Actuation moment.
$\Omega$: Actuation frequency.
$\alpha$: Distance from tail base at which actuation moment acts.
t: Time.
$\rho$: Density of flexible (tail) section (either constant or varying with X).
E: Modulus of elasticity of flexible (tail) section (either constant or varying with x).
A: Cross-sectional area of flexible (tail) section (varies with x).
I: Second moment of cross-sectional area of flexible (tail) section (varies with x).
$f$: Distributed force along the tail (actuation).
$\gamma$: Resistive force along the tail due to interaction with environment.
w: Normal component of relative velocity between tail and liquid environment.
U: Mean swimming speed relative to the stream.
V: Body wave speed.
C: Effective damping coefficient on lateral body motions (varies with x).
u: Equivalent lateral displacement of tail after change of variables.
$\Psi$: Polynomial for change of variables.
$\alpha$: Constant used in polynomial for change of variables.
$A_0$: Cross-sectional area of flexible (tail) section at x=0.
$I_0$: Second moment of cross-sectional area of flexible (tail) section at x=0.
$C_0$: Effective damping coefficient on lateral body motions at x=0.
$\Phi$: Equivalent lateral displacement's time components (function).
X: Equivalent lateral displacement's space components or "modes" (function).
P: Natural frequencies.

DETAILED DISCUSSION

One of the main obstacles for increasing the range of action of mobile robots is the problem of energy efficiency. An autonomous robot has to carry its own power supply. However, if it can use energy efficiently while accomplishing its tasks it will be able to run longer missions with the same supply or alternatively, if weight is an issue, use a smaller supply for the same mission. In addition, mechanism robustness is always paramount if missions involve hazardous terrains. However, most autonomous robots use mechanical elements such as electrical motors, gearboxes, linkages, cams, pulleys, etc, to transmit power internally even though these have limited efficiencies. The combination of these elements always yields overall low system efficiencies. Furthermore, the nature of current mechanical elements is not robust enough to withstand harsh environments without sophisticated and complex mechanical protection. As a result most autonomous robots designs are expensive.

Scientists have studied fish swimming as an energy efficient alternative to current underwater propulsion methods. Several robots have been built in order to prove this theory (Barrett, Anderson, Kumph). (Full bibliographic data for all references cited may be found immediately preceding the claims.) However, most of them still use hyper-redundant manipulator type designs with classical low efficiency machine elements to transmit power internally. Therefore, the low internal energy transfer might diminish energy gains brought by a more efficient external momentum transfer when using fish swimming modes. Kumph built a tethered 0.82 m long robotic pike with a drive system comprising five servomotors. The robot achieved a maximum forward velocity of 0.09 m/s at an actuation frequency of 1 Hz, with a supply of 17V drawing 0.2 A. The estimated system efficiency was 13.5%.

This disclosure addresses the problem of accomplishing an alternative mechanical implementation of such swimming modes in a robot. It assumes that the kinematic behavior for forward motion described in Barrett is a given optimal behavior in terms of achieving efficient momentum transfer to the environment. Then a problem addressed is how to design a machine where the implementation of such kinematic behavior (fish swimming modes) is more efficient and requires the least power consumption. A design proposed herein has the additional feature of being intrinsically robust and simple.

Previous work on alternative mechanisms for achieving fish-like underwater motions is not very extensive. FIG. 1 displays an example of a classical prior art design for fish-like mechanisms. A classic design uses a hyper redundant manipulator type assembly 102 to achieve the kinematics required to mimic fish motions. This design requires actuation of a discrete number of joints 104 connecting rigid links 106, to achieve the required kinematics. Actuators (not shown) can be either directly connected to each joint or located elsewhere such as in the head portion 108, and connected through transmissions such as cables and pulleys, cams or gears. This approach tends to yield a more complex mechanism with large part counts, which makes them more expensive, harder to assemble, and also prone to failures.

Mcletchie casted flexible fish shapes with a stiffer spine embedded in the models and chose the material modulus so that the wave speed and body amplitude of the actuated fish would match a parametric model of fish swimming. A rod attached to the front part of the bodies and driven by an external motor actuated the models by applying a moment. Therefore, models had to be towed. The vibrational response of the models was found numerically. There was a lack of an analytical solution to which a designer could relate for further analysis and development. Maximum hydrodynamic system efficiency was estimated to be close to 30% at an actuation frequency of 6.5 Hz, and an actuation angle of 7°. The net thrust at this efficiency was close to 0.2N. Davidson and Julian built a radio controlled maneuverable fish with a flexible actuated tail.

Blickhan et al. did studies on the benefits of elastic energy storage in steady swimming. Based on dolphin swimming data they calculated optimal spring compliances. The values found were similar to measured tendon compliances.

Harper et al. investigated the potential benefit of elastic energy storage in the propulsion of a swimming robot. They concluded that the addition of linear springs to the system provides a means to reduce energy required of the power supply.

In contrast, an approach according to inventions hereof yields fairly simple mechanisms that can achieve the same kinematics with fewer actuators (in principle, only one actuator is needed) and with more natural motions. Furthermore, since a proposed design consists of a single continuous body, all the parts embedded inside the mechanism are protected from the environment which makes the overall mechanism more robust.

The present inventions present a design methodology for a potentially more efficient class of underwater propulsion mechanisms using body compliance and natural modes of vibration to eliminate any need for traditional discrete transmission mechanisms to achieve desired kinematics. Additional inventions disclosed are processes of design and fabrication. Experimental performance measurements of resulting robot fish are also presented.

Design Methodology

Figure 2:
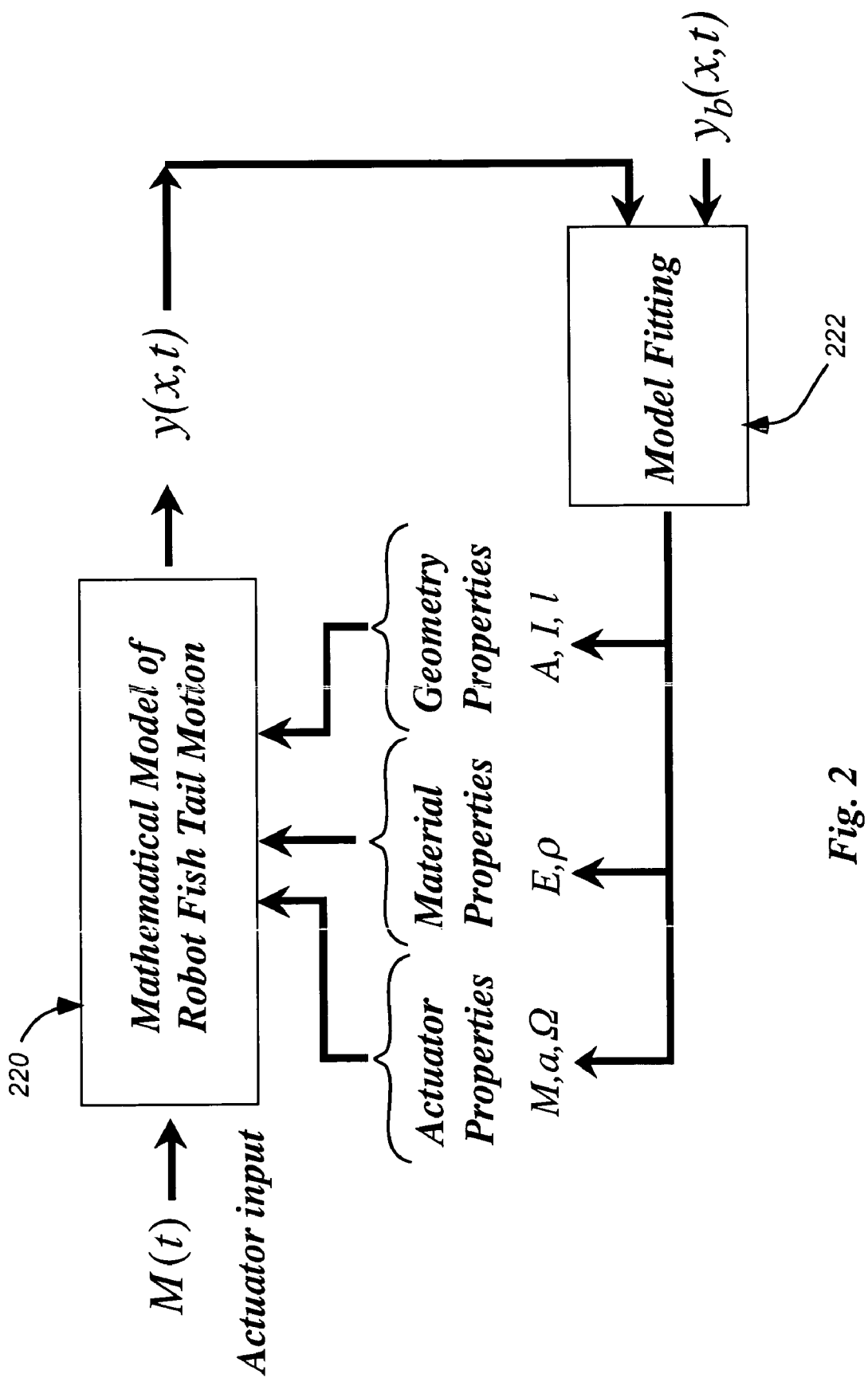
FIG. 2 is a schematic representation in flow chart form of a method of an invention hereof, for designing a robot to mimic swimming motion of a live animal.

A useful goal is to design a robot that swims in the manner of a fish. Two important fish swimming modes, that are well understood by the current art, are named anguilliform and carangiform. The former is an oscillatory mode in which the entire body participates, but amplitude increases towards the rear end of the body. The latter mode, of which a tuna is representative, is such that oscillations become significant only in the posterior half or even third part of the fish length, the front of the fish almost does not move. Studies point to the idea that carangiform swimming mode is more efficient and can achieve higher speeds (Lighthill, Videler). Therefore, presented herein is a robot design that uses a carangiform swimming mode. The design methodology shown schematically in FIG. 2 consisted of fabricating a robot 302, shown schematically in FIG. 3, with a rigid anterior part and a flexible posterior part 306, which is referred to herein as the head and tail respectively. The robot tail was first modeled 220 as a non-uniform flexible beam and the forced vibrations response $y(x,t)$ was derived and used to design a robot tail whose dominant modes of vibration corresponded 222 closely to a kinematic mathematical model of body deformation, $y_b(x,t)$ which describes in general the body deformation of a carangiform fish based on data taken from actual fish. The variables are defined below.

Figure 4:
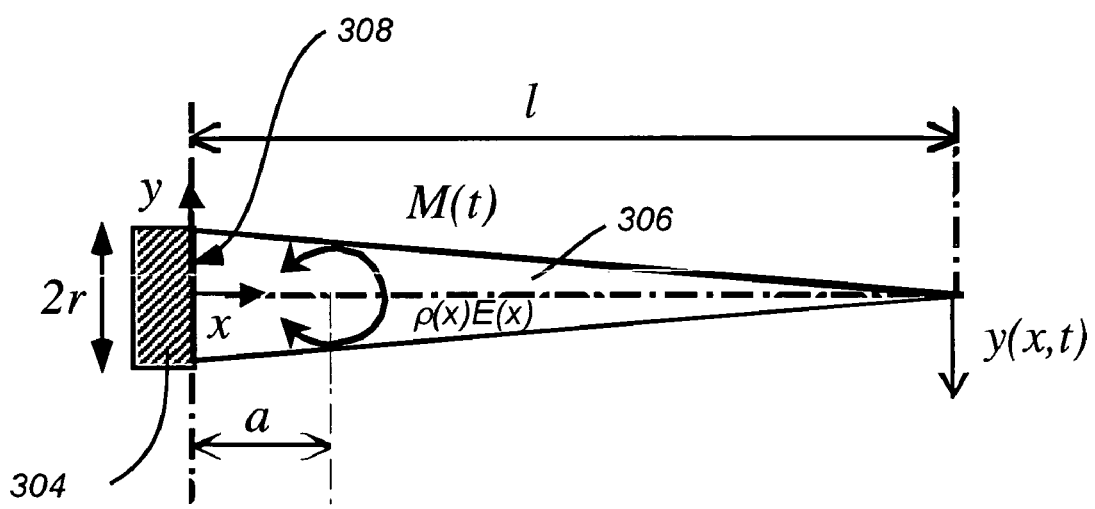
FIG. 4 is a schematic representation of a tail portion of a fish model as shown in FIG. 3.

According to Barrett, one such model of body deformation is a traveling wave that increases in amplitude from the nose to the tail of a carangiform fish and is given by:

$$y_b(x_b, t) = (c_1 x_b + c_2 x_b^2)[\sin(Kx_b)\cos(\omega t) + \cos(Kx_b)\sin(\omega t)] \quad (1)$$

where, as shown in FIG. 4, $y_b$ is the lateral displacement of the fish body at a distance $x_b$ from the fish nose. It will be assumed that the values of the linear wave amplitude envelope $c_1$, the quadratic wave amplitude envelope $c_2$, the body wave number $K$, and the body wave frequency $\omega$ are known for a given fish (or application). Other types of fish, for instance, an eel, are described by different kinematic models, which can be derived, or which are known (Videler). It has been discovered by the present inventors that the actuation of a mechanism whose principal modes of vibration correspond to the desired motions in Eq. (1) has the potential of requiring less energy than actuating a manipulator type design such as in Barrett and Kumph, shown at 102, FIG. 1, where motions of each link 106 are controlled to achieve the desired kinematics. Required "trajectories" can be achieved using only one actuator, instead of a using discrete, larger number, in the case of a manipulator type design. Furthermore, internal transmission elements are eliminated. In the next section a dynamic model of the tail is developed that will be used for the design.

Robot Tail Mathematical Models

Figure 3:
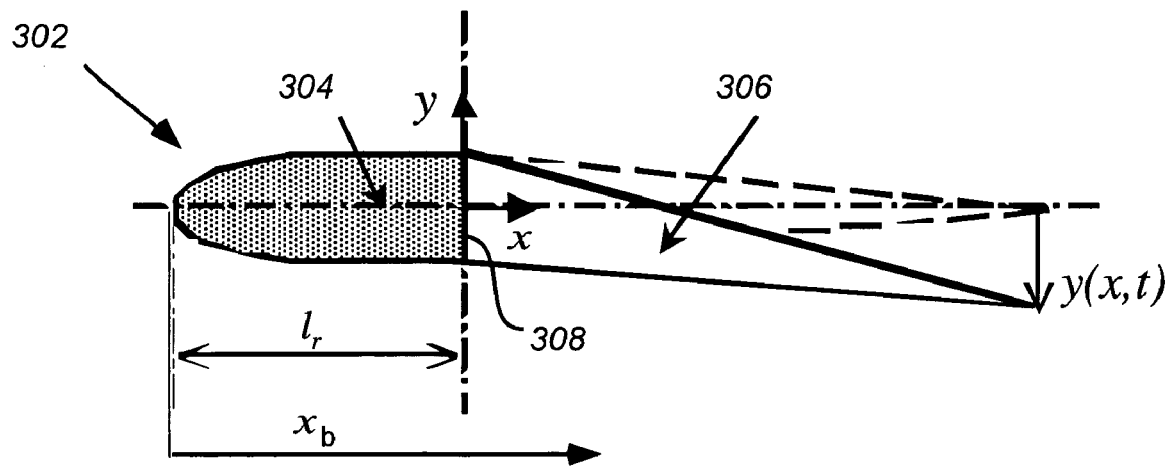
FIG. 3 is a schematic representation of a fish model, showing geometry and variables used.

FIG. 3 shows a diagram of a basic configuration of a robot 302 together with a reference frame used for development of the model that describes the robot. Since a design of an invention hereof exploits the carangiform swimming mode, the posterior two thirds 306 of the body is flexible, $l_r$ denotes the length of the rigid part of the robot body ($X=x_b-l_r$). The manner this is achieved will be further explained below. The robot's tail can be modeled as a Bernoulli-Euler beam with varying cross-sectional area. This mathematical model is appropriate since for most fish, the tail amplitude of motion is not very big compared with their length (the excursion of the tip of the tail is approximately 10% of the overall body length) (Videler). Therefore, all the mass elements in the flexible tail can be assumed to move in pure translations. In addition, most of the potential energy is due to bending rather than shear.

FIG. 4 shows a tail 306 modeled as a beam with variable cross-section. Parameters l, and a, denote, respectively, the length of the tail and the distance from the tail base 308 at which a time-varying actuation moment M(t) acts. The forced vibrations of a non-uniform beam moving steadily in a fluid are described by the following partial differential equation:

$$\rho A(x)\frac{\partial^2 y}{\partial t^2} + \frac{\partial^2}{\partial x^2}\left[EI(x)\frac{\partial^2 y}{\partial x^2}\right] = f(x, t) - \gamma(w) \quad (1)$$

where y is the lateral displacement of a tail element relative to a reference frame fixed to the tail as displayed in FIG. 4. The density $\rho(x)$ and the modulus of elasticity $E(x)$ of the tail are taken to be constant throughout the tail continuum for this initial discussion (For a subsequent discussion, either or both may vary with x.) The cross-sectional area A and the second moment of cross-sectional area I of the tail vary with x. A distributed force $f$ is used to generalize the possible actuation forces. The resistive forces $\gamma(w)$ due to interaction with the fluid environment depend on the normal component w of relative velocity between the tail 306 and the fluid environment. For an undulating body with body wave speed V and mean swimming speed U relative to the stream, w is given by:

$$w = \frac{\partial y}{\partial t}\left(1 - \frac{U}{V}\right) = \varepsilon\frac{\partial y}{\partial t}.$$

The resistive force's dependence on w can be approximated to be linear at very low Reynolds numbers and is generally taken to be quadratic at high Reynolds numbers. The case of swimming at high Reynolds numbers is of interest and thus the resistive forces are modelled as some sort of form drag. However, the resulting PDE would be nonlinear and finding a closed form solution becomes more difficult. Thus, the resistive forces can be approximated by a linear dependence (viscous drag). This underestimation of the resistive forces will tend to yield results that are overestimations of the actual behavior, but it would allow finding an approximate solution for the predicted transverse motions of the tail. Therefore, if it is assumed that the flow around the fish is steady ($\varepsilon$=st.), the resistive forces can be modelled by a term analogous to viscous damping, with a damping coefficient that varies with x since the area of the tail changes with x as well, as follows:

$$\rho A(x)\frac{\partial^2 y}{\partial t^2} + \frac{\partial^2}{\partial x^2}\left[EI(x)\frac{\partial^2 y}{\partial x^2}\right] = f(x, t) - C(x)\frac{\partial y}{\partial t}. \quad (2)$$

The boundary conditions for this case (clamped-free) are, $$(y)_{x=0} = 0 \qquad \left(\frac{\partial y}{\partial x}\right)_{x=0} = 0 \quad (3)$$

$$\left(EI(x)\frac{\partial^2 y}{\partial x^2}\right)_{x=1} = 0 \qquad \frac{\partial}{\partial x}\left(EI(x)\frac{\partial^2 y}{\partial x^2}\right)_{x=1} = 0.$$

Finding a closed form solution for the problem defined by Eqs. and (3) is not straightforward. However, closed form solutions exist for the uniform counterpart of the PDE given by $$\rho A_0\frac{\partial^2 u}{\partial t^2} + EI_0\frac{\partial^4 u}{\partial x^4} = f(x, t) - C_0\frac{\partial u}{\partial t}. \quad (4)$$

The transformation leading from Eq. (2) to (4) is explained in Gottlieb and in Abrate. It involves essentially a change of variable u=Ψy, where the functions Ψ are polynomials in x of at least second order. In the present analysis a quadratic variation of the tail cross section was assumed, which is fairly representative of real fish profiles. Thus, it is reasonable to use:

$$\psi = \left(1 - \alpha\frac{x}{l}\right)^2, A = A_0\psi, I = I_0\psi^2, C = C_0\psi. \quad (5)$$

where $A_0$, $I_0$, and $C_0$ are the cross sectional area, the second moment of cross-sectional area, and the damping coefficient respectively at x=0. Equation 4 can be solved using the method of virtual work. The transverse deflection response, as expressed with the change of variable, is expanded in series:

$$u = \sum_{j=1}^{\infty}\phi_j(t)X_j(x). \quad (6)$$

A virtual displacement for the $i^{th}$ mode is defined as $\delta u_i = \delta\phi_i X_i$. The sum of all virtual works in the system should add up to zero as explained in Timoshenko et al. The response of the $i^{th}$ vibrational mode can be found by using the Duhamel integral (Timoshenko et al.). Reverting the change of variables, the response is found to be $$y(x, t) = \sum_{i=1}^{\infty}\frac{X_i X'_{ia} e^{\frac{-c_0}{2\rho A_0}\tau}}{\psi\rho A_0 p_i}\int_0^t e^{\frac{c_0}{2\rho A_0}\tau}M_a(\tau)\sin p_i(t-\tau)d\tau. \quad (7)$$

In the actuation scheme disclosed herein, the moment $M_a$, applied at a distance a from the tail base, is chosen as $$M_a(t) = M\sin(\Omega t). \quad (8)$$

Combining equations (7) and (8), and evaluating the integral gives the following expression $$y(x, t) = \sum_{i=1}^{\infty} f_i(x) e^{-Nt} [g_i(t) + e^{Nt} h_i(t)], \text{ where,} \quad (9)$$

$$f_i(x) = \frac{X_i X'_{ia} M}{\psi \rho A_0 p_i}, \quad N = \frac{C_0}{2\rho A_0}$$

$$g_i(t) = \frac{2N p_i \Omega \cos(p_i t) + \Omega(N^2 - p_i^2 + \Omega^2) \sin(p_i t)}{(N^2 + p_i^2)^2 + 2(N^2 - p_i^2)\Omega^2 + \Omega^4}$$

$$h_i(t) = \frac{-2N p_i \Omega \cos(\Omega t) + p_i(N^2 + p_i^2 - \Omega^2) \sin(\Omega t)}{(N^2 + p_i^2)^2 + 2(N^2 - p_i^2)\Omega^2 + \Omega^4}.$$

The steady state response is then $$y_{ss}(x, t) = \sum_{i=1}^{\infty} f_i(x) h_i(t). \quad (10)$$

For the present boundary conditions (clamped at one end— free at the other), the normalized eigenfunctions and angular frequencies are given by $$X_i = a_i [\cos(k_i x) - \cosh(k_i x)] + b_i [\sin(k_i x) - \sinh(k_i x)],$$

$$p_i = k_i^2 \sqrt{\frac{E I_0}{\rho A_0}}$$

where the ratio of coefficients $a_i$ and $b_i$ is known, and $$k_i \approx \left(i - \frac{1}{2}\right) \frac{\pi}{l},$$

(Timoshenko et al.). For design purposes it is desireable to match the terms in equations (1) and (10), so equation (10) is rewritten as $$y_{ss}(x, t) = \sum_{i=1}^{\infty} \frac{X_i X'_{ia}}{\psi} [Q_i \cos(\Omega t) + R_i \sin(\Omega t)],$$

where, $$Q_i = \frac{-2N\Omega M}{\rho A_0 ((N^2 + p_i^2)^2 + 2(N^2 - p_i^2)\Omega^2 + \Omega^4)}$$

$$R_i = \frac{(N^2 + p_i^2 - \Omega^2) M}{\rho A_0 ((N^2 + p_i^2)^2 + 2(N^2 - p_i^2)\Omega^2 + \Omega^4)}.$$

Therefore, for the transverse vibrations of the tail to match the parametric model of equation (1), the following conditions must be met (for $x \geq 0$):

$$\sum_{i=1}^{\infty} \frac{X_i X'_{ia}}{\psi} Q_i = (c_1 x_b + c_2 x_b^2) \sin(K x_b) \quad (11)$$

$$\sum_{i=1}^{\infty} \frac{X_i X'_{ia}}{\psi} R_i = (c_1 x_b + c_2 x_b^2) \cos(K x_b).$$

$$\Omega = \omega$$

The speed of convergence of the series in equations (11) depends on the values of the parameters. Depending on the dimensions and the complexity of the parametric model that needs to be matched, more or fewer terms (modes) might be needed for an approximation to match the desired kinematics.

Robot Design and Fabrication Design

The previous section described the dynamics of motion of a general continuum whose shape resembles a fish tail. The tail's modes of vibration can be made to match the parametric model of a fish (a carangiform) swimming presented in equation 1 by using the constraints given by equations (11) in the design of the continuum. The third equation in (11) is the only explicit condition, since it prescribes the actuation frequency $\Omega$ to the body wave frequency $\omega$ of the fish being modeled. The series on the left hand side of the first two equations in (11) depend on nine design parameters: $a$, $A_0$, $I_0$, $\alpha$, $l$, $E$, $\rho$, $M$, $\Omega$. If it is desired to preserve the geometry of the fish being modeled, the parameters $A_0$, $I_0$, $\alpha$, and $l$ are known from that observable geometry. Then the remaining unknown design parameters are the actuation point $a$, the modulus of elasticity $E$, the density $\rho$, and the magnitude of actuation moment $M$ (since $\Omega$ is prescribed by the third equation in (11)). From the first two equations in (11) arises the following condition $$\frac{\sum_{i=1}^{\infty} X_i X'_{ia} Q_i}{\sum_{i=1}^{\infty} X_i X'_{ia} R_i} = \tan(K x_b). \quad (12)$$

From equation (12) it can be seen that for an acceptable approximation, for this particular parametric model of swimming, at least the first two terms of the series must be considered since otherwise the left hand side of the equation would be a constant. Also, the right hand side of the equation has discontinuities at $x_b = n\pi/2K$ (with $n=1,3,5,\ldots$). The problem is reduced then to finding a set of parameters to match the models in the two sides of equation (12), achieving the smallest error possible. This fitting 222 can be done numerically in a least squares sense or using any other appropriate fitting technique. An additional constraint of minimizing the value for M, was added. The designer can optionally prescribe some of the unknown variables. Also by including the constraint of minimizing the value of the magnitude of the actuation moment M, the energy consumption of the design is effectively minimized, which matches the kinematic behavior of a fish, since the input power is $P_{in} = M\Omega$. The parameters chosen for a representative design are listed in Table 1. This design is radio controlled for testing purposes, so the actuation frequency can be set to any value during operation. However, the results presented below indicate that an optimal performance is achieved using a frequency close to the value prescribed.

TABLE 1

Design Parameters

| Parameter | Value |
| --- | --- |
| a | 0.05 [m] |
| $A_0$ | $3.04 \times 10^{-3}$ [m$^2$] |
| $I_0$ | $4.9 \times 10^{-7}$ [m$^4$] |
| α | 0.42 |
| l | 0.1 [m] |
| E | 0.04 [MPa] |
| ρ | 1080 [Kg/m$^3$] |
| M | 1.4 [Nm] |

Fabrication

Figure 5:
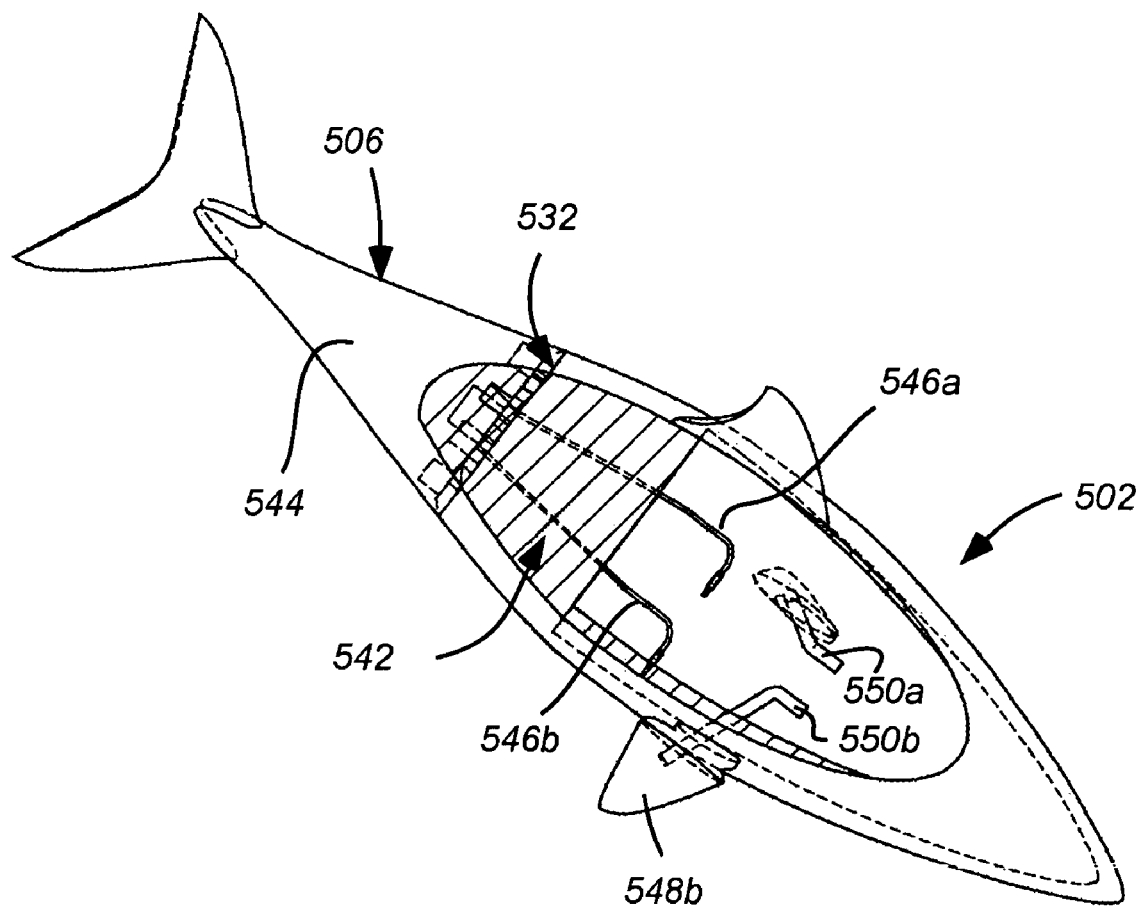
FIG. 5 is a schematic representation of a fish robot of an invention hereof, with some portions of outer surface removed to show interior components.
Figure 5A:
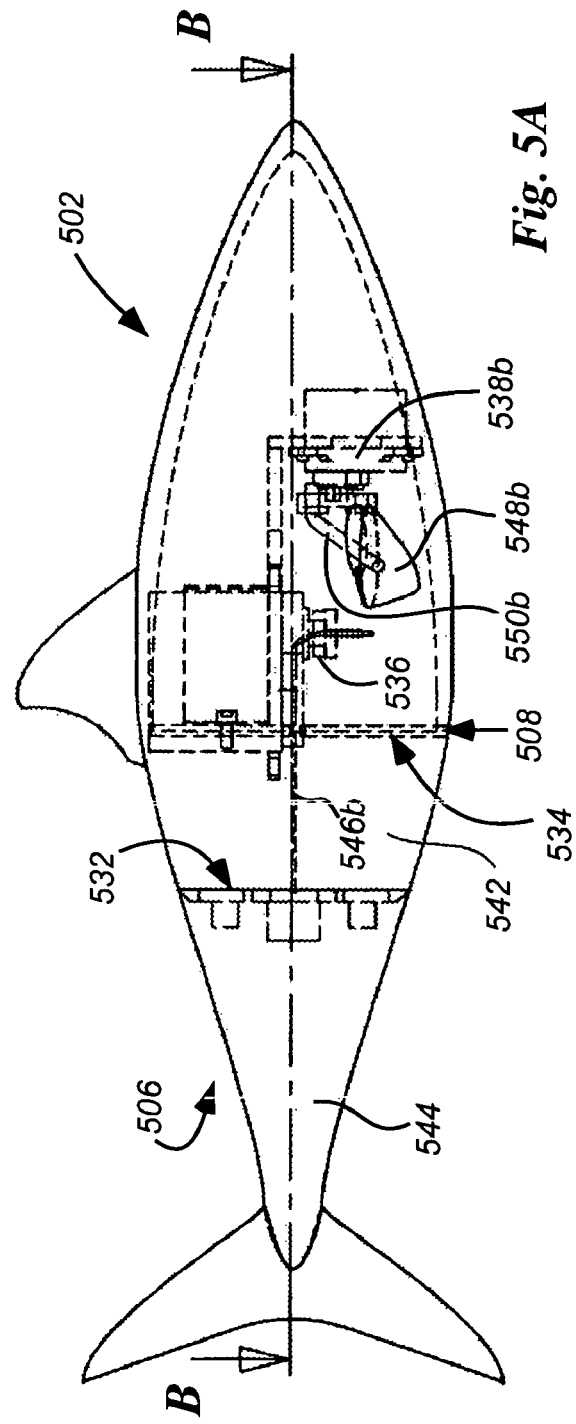
FIG. 5A is a schematic representation of a side view of the fish robot shown in FIG. 5, also showing a servo motor that is not shown in FIG. 5.
Figure 5B:
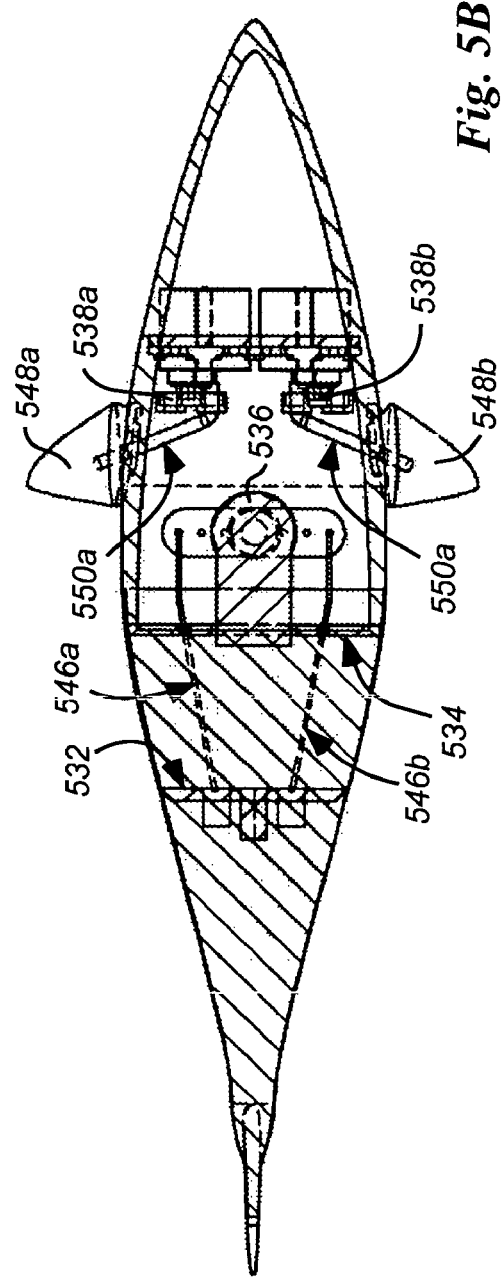
FIG. 5B is a schematic representation in horizontal cross-section of a top view of the fish robot shown in FIG. 5, along the lines B-B, also showing servo motors not shown in FIG. 5.
Figure 6A:
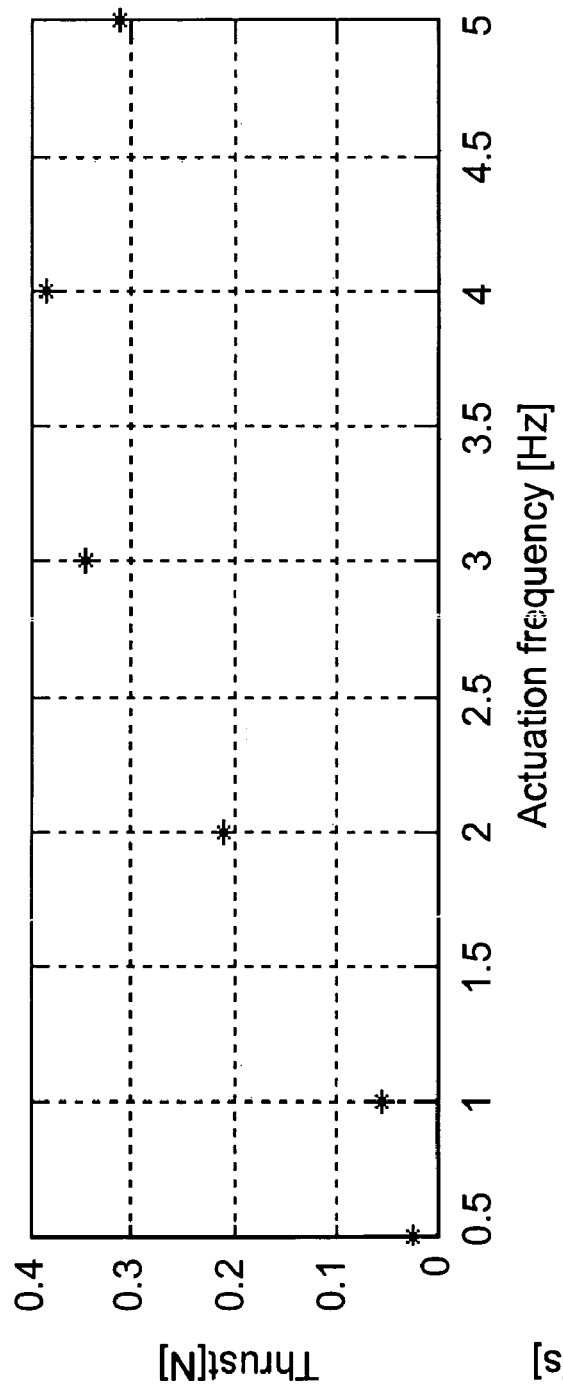
FIG. 6A is a graphical representation showing thrust of a fish robot of an invention hereof, as a function of actuation frequency.
Figure 6B:
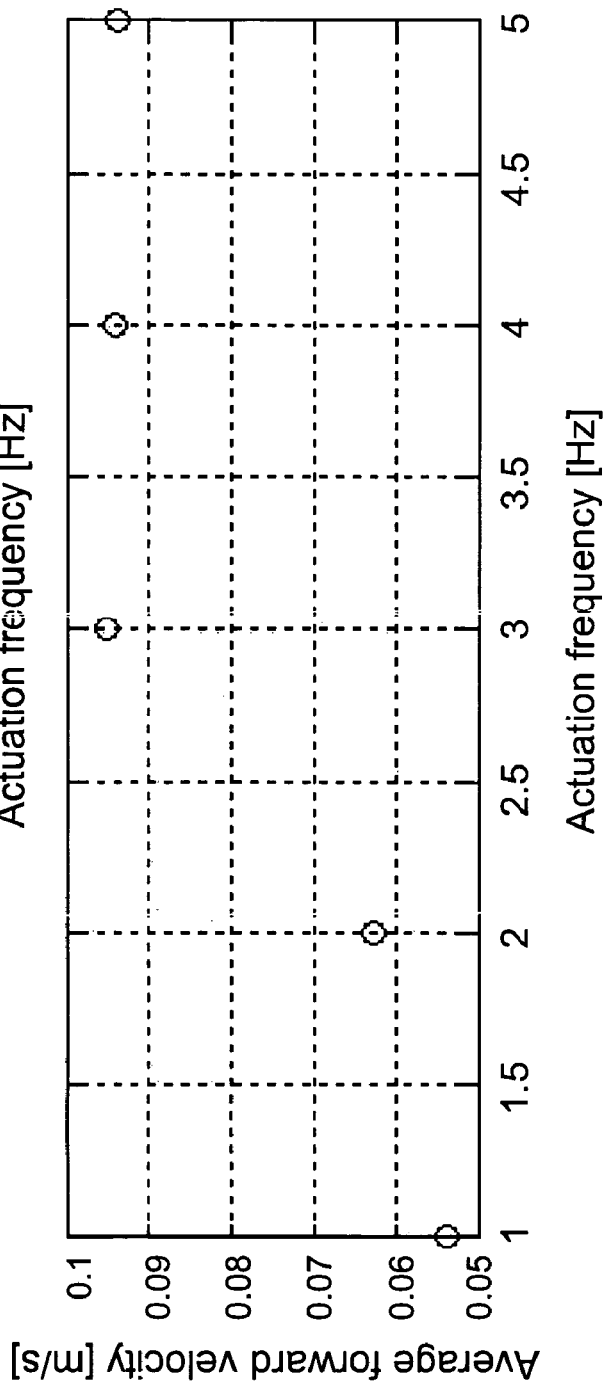
FIG. 6B is a graphical representation showing average forward velocity of a fish robot of an invention hereof, as a function of actuation frequency.

An appropriate material can be chosen once the required material properties are known. The next step is to mechanically fabricate a tail that corresponds to the required geometry. FIG. 5 shows schematically a representative fish robot in an external view, with some portions of the outer surface removed. FIG. 5A shows the robot shown in FIG. 5 in a side view. FIG. 5B shows a top view of the cross-section along the lines BB. In addition it is convenient to have rigid parts, e.g., 532, 534 embedded in the continuum, which give a good support for actuation. Known casting techniques can be used with shape deposition manufacturing (SDM) principles, which are explained in (Cham et al.). Any other reasonable manufacturing process is also possible. For most of the parts a machinable base is used, such as a block of solid wax, where the mold of a given part's profile can be machined. Next, parts such as actuators 536, 538a, 538b, or sensors, are positioned inside the empty mold and the required material is poured in resin form. Once the material cures, some machining can still be done to complete what becomes a single continuous piece.

FIG. 5, FIGS. 5A and 5B, show the tail design. Flexible 542, 544 and stiff 532, 534 sections are stacked together forming a single continuum. Stiff sections are used for actuation support, and flexible sections provide a compliant structure that transmits momentum to the environment. The harmonically varying moment input is applied by actuating the stiff plate 532 embedded inside the tail 506 at a distance αfrom the tail base 508. A servomotor 536 actuates the plate 532 by pulling two inextensible cables 546a, 546b attached to the plate 532. While this example uses a classical actuator, in this case a servomotor, no classical transmission elements (pulleys, gear boxes, etc.) are present between the servomotor 536 and the end-effector, in this case the tail 506. Also since the design is monolithic no sealing is required for that section of the body 502.

Maneuverability

The mechanical fish 502 can be steered thanks to a combination of the tail motions and the actuation of the side fins 548a, 548b by two embedded miniature servos 538a, 538b, or through each method independently. As shown in FIG. 5B, two miniature servos 538a, 538b are embedded at the front end of the mechanical fish; each miniature servo moves a lever rod 550a, 550b connected to each side fin thus recreating side fin motions similar to real fish's.

Control

All the servomechanisms inside the mechanical fish can be remotely operated by radio. A receiver (not shown) with enough channels to control each servo can be embedded inside the mechanical fish at any suitable location. Hence a radio transmitter with enough control channels can be used to control the mechanical fish.

Power

A rechargeable battery can also be embedded inside the mechanism body in any other convenient location within the frontal body cavity. To recharge the battery, a covered, waterproof, connector (not shown) can be used to connect a standard battery charger to the fish.

Significant advantages of this type of design are that the compliance is implemented by the structure itself, and the mechanism is self-contained.

A variation is to use a more efficient type of actuator.

The tail 506 can be casted using a two-part mold. In this configuration example, the rigid parts 532 and 534, made from IE-70D polyurethane, are sandwiched inside the mold, and IE-10AH polyurethane (both from Innovative Polymers, Inc., St. Johns, Mich.) is poured in between them. The maximum tail tip amplitude is close to 0.1 m in air, with an input torque of 1.4 Nm.

Experimental Setup and Results

To measure propulsion performance parameters such as thrust and speed, several experiments were performed. The experiments were made in a towing tank where models can be towed at controlled velocities by a carriage and also swim freely. The tank is 30 m long, 2.5 m wide, and 1.2 m deep. The carriage is suspended over the testing tank and driven by a flat belt. Output from sensors can be recorded by the tank data acquisition system. The sampling frequency used was 200 Hz.

A flexural mechanism held the fish underwater while transmitting the forces acting onto it to a tension compression load cell without applying any shear to it. Experiments were made to measure both the thrusts and velocities achievable with a design of an invention hereof. Figs. FFA and FFB, respectively, show measured static thrust and average forward velocity as a function of the actuation frequency. A maximum is noted in both graphs at an operational frequency close to 4 Hz. This most likely reflects a combined effect of reaching the optimum point of the servomotor efficiency and being close to the prescribed frequency by which the fish swimming mode is more closely mimicked.

A maximum thrust close to 0.4N was achieved at an operating frequency of 4 Hz. Also the peak average forward velocity of 0.095 m/s was reached at a similar frequency.

A design of a present invention eliminates the need for classical internal transmission elements between the actuator and the end-effector, which in this case is the whole tail. Furthermore, the fact that the mechanism is a single monolithic part eliminates the need for sealing in that section, and also makes is more robust against failure.

The mechanism described so far is passive. It is designed to perform under certain specific environment conditions assumed in the model. Therefore, the performance of the design discussed above would be hampered by changes in environmental parameters. Additional work described below incorporates providing active mechanisms inside the tail continuum to address this problem.

Non-prismatic Bodies with Non-homogenous Material Distributions

A reasonable more general mathematical extension for the tail model consists of a non-prismatic beam with elliptical cross-sections with longitudinal, non-homogenous material distributions represented by Eq. (13).

$$\rho(x)A(x)\frac{\partial^2 y}{\partial t^2} + \frac{\partial^2}{\partial x^2}\left[E(x)I(x)\frac{\partial^2 y}{\partial x^2}\right] = f(x,t) - C(x)\frac{\partial y}{\partial t} \quad (13)$$

Motions of interest are still in the transversal y-direction, and the model described above also shows that local deflections depend on material, geometrical, and actuator properties. Furthermore, by providing variations of local material properties in the longitudinal direction, the control over local deflection properties can be increased. Thus, for this following discussion, density $\rho(x)$ and Modulus $E(x)$ are both functions of x. The transverse deflection response can again be expanded in series:

$$y = \sum_{j=1}^{\infty} \phi_j(t) X_j(x).$$

Applying the principle of virtual work to Eq. (13) and working out the new orthogonality properties of the eigenfunctions (Timoshenko) Eq. (13) can be solved and the total response is $$y(x,t) = \sum_{i=1}^{\infty} \frac{X_i X'_{ia} e^{\frac{-b_i}{2m_i}t}}{m_i p_a} \int_0^t e^{\frac{b_i}{2m_i}\tau} M_a(\tau)\sin p_a(t-\tau)\,d\tau, \quad (14)$$

where $p_a$ are the new natural frequencies, $m_i$ is an equivalent expression of mass per unit length, and $b_i$ is an equivalent expression of damping per unit length.

No assumptions have been made yet regarding the form of functions $E(x)$, $\rho(x)$, $A(x)$, $I(x)$, and $C(x)$, so the model is still reasonably flexible. Also, it is interesting to note the similarity, at least in form, of Eq. (14) with the response of the case discussed initially above, where the material properties were assumed to be constant. In order to find the eigenfunctions the eigenvalue problem must be solved (Timoshenko et al.).

The total solution for this case can be written as:

$$y(x,t) = \sum_{i=1}^{\infty} \mu_i(x) e^{-\eta t}[\upsilon_{1i}(t) + e^{\eta t}\upsilon_{2i}(t)], \quad (15)$$

where, $$\mu_i(x) = \frac{X_i X'_{ia} M}{m_i p_a}, \quad \eta = \frac{b_i}{2m_i}$$

$$\upsilon_{1i}(t) = \frac{2\eta p_a \Omega \cos(p_a t) + \Omega(\eta^2 - p_a^2 + \Omega^2)\sin(p_a t)}{(\eta^2 + p_a^2)^2 + 2(\eta^2 - p_a^2)\Omega^2 + \Omega^4}$$

-continued
$$\upsilon_{2i}(t) = \frac{-2\eta p_a \Omega \cos(\Omega t) + p_a(\eta^2 + p_a^2 - \Omega^2)\sin(\Omega t)}{(\eta^2 + p_a^2)^2 + 2(\eta^2 - p_a^2)\Omega^2 + \Omega^4},$$

where, further, an input torque of the form $M_a(t)=M\sin(\Omega t)$ has been assumed as well. The steady state response is $$y_{ss}(x,t) = \sum_{i=1}^{\infty} \mu_i(x)\upsilon_{2i}(t). \quad (16)$$

The models in Eqs. (10) and (16) can be used to predict transverse deflections of flexible mechanisms that resemble fish tails.

The manner in which the model in Eq. (16), and any other extensions, can be used to design biomimetic mechanisms is analogous to the process represented by Eqs. (11) and (12) and summarized in FIG. 2.

Simulation and Experimental Results

To verify that the prototypes matched a desired performance, a series of experiments have been performed. A prototype's kinematics were identified and compared to simulation results based on the models studied, Eq. (10) and Eq. (16), and published fish kinematic data.

Simulations

Figure 7A:
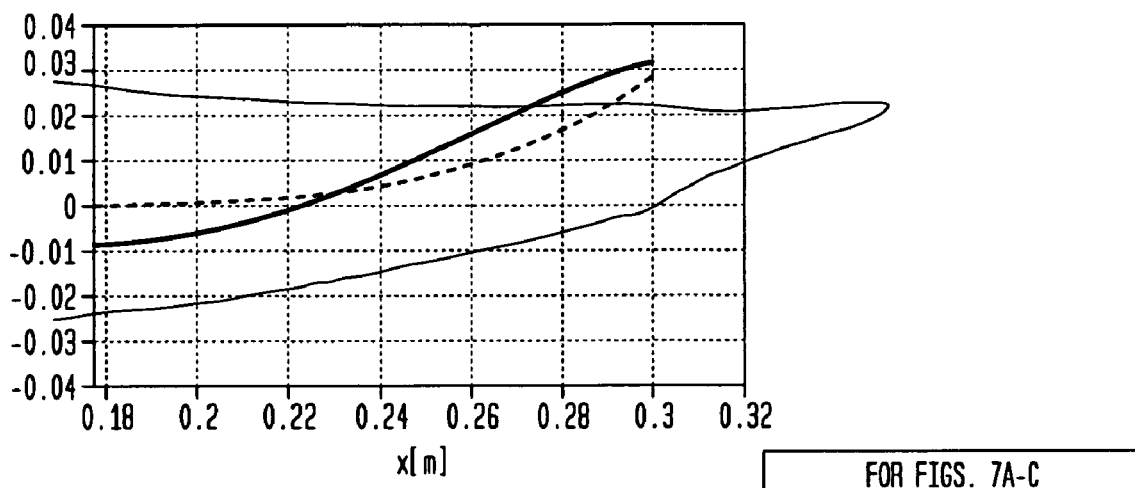
FIGS. 7 A-C are schematic graphical representations, showing from a top view, a comparison between an actual fish robot tail portion (outline); the centerline conformation predicted by a mathematical model of the robot tail portion (dotted lines), and the conformation of an actual living fish (solid lines), described by a mathematical model that was used to generate the mathematical model for the robot, and to select the material properties of the robot, at different points in a swimming cycle for a tail (Tail 1) with a uniform material distribution.
Figure 7B:
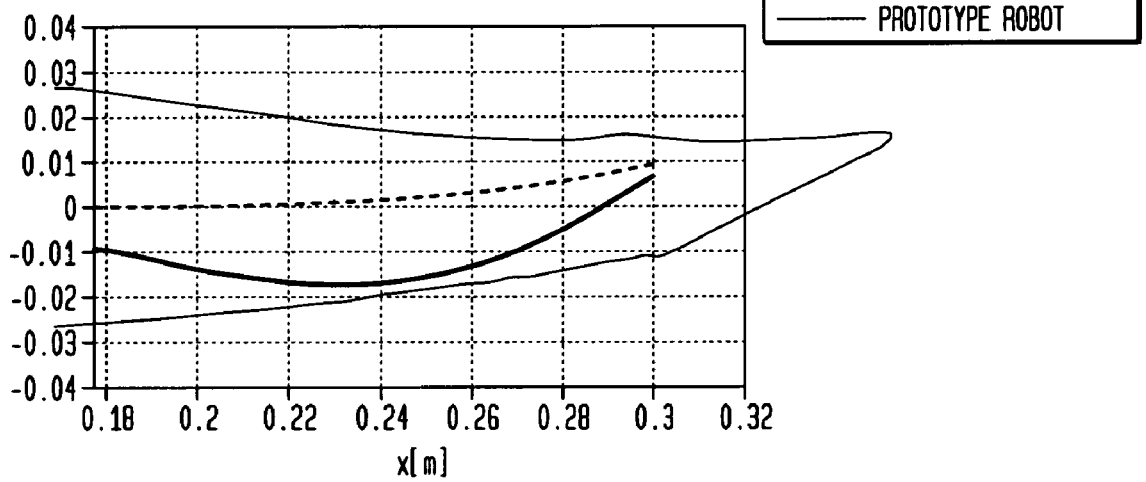
Figure 7C:
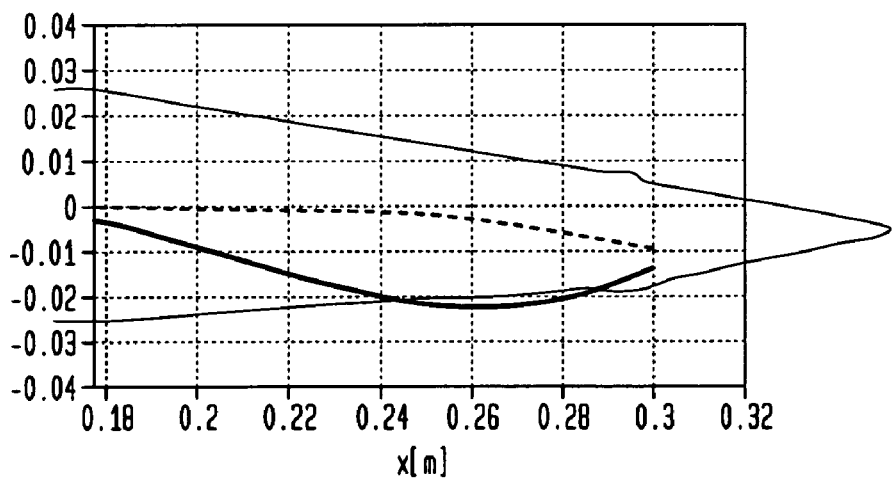
Figure 8A:
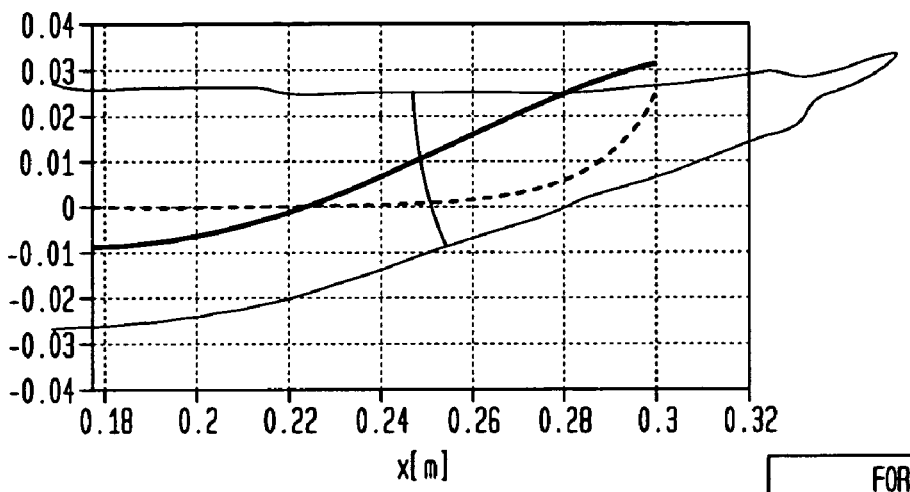
FIGS. 8 A-C are schematic graphical representations similar to FIGS. 7 A-C, but for a tail (Tail 2) having a non-uniform material distribution.
Figure 8B:
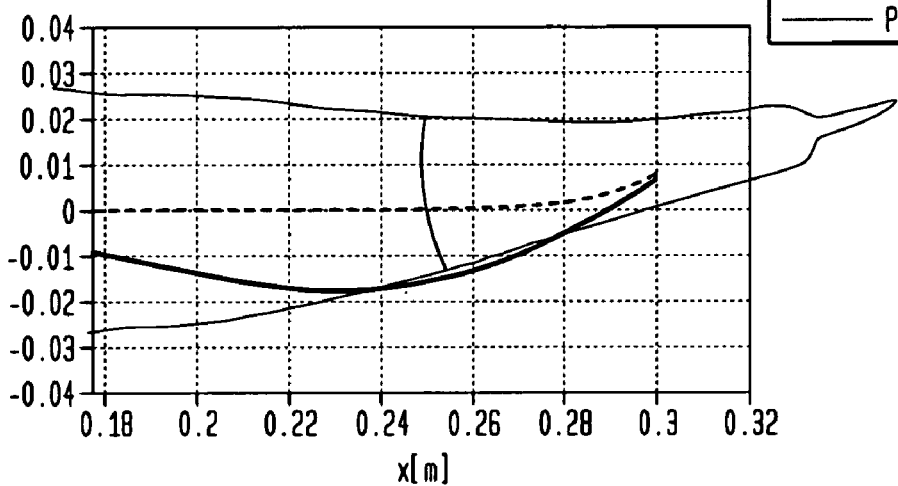
Figure 8C:
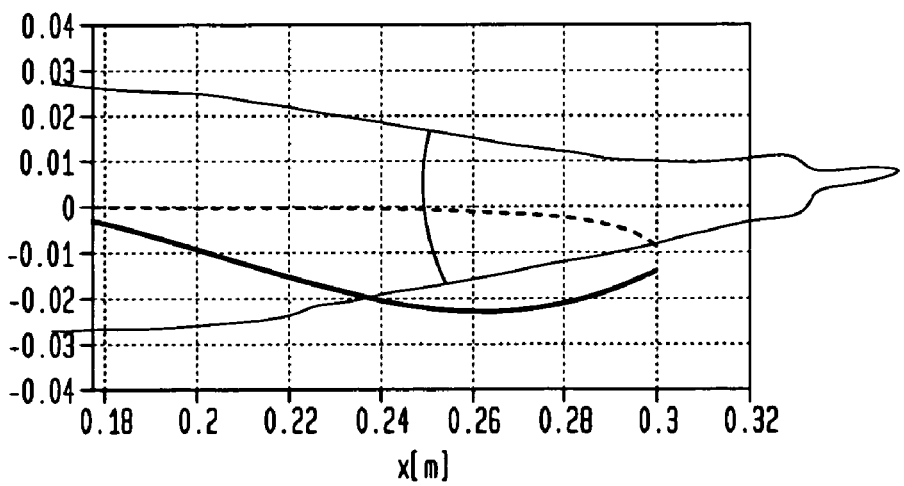

Fish swimming kinematic data was obtained combining Eq. (1) and parameters provided in Videler for *Pollachius Virens*. FIGS. 7 A-C and 8 A-C show graphs where this kinematic data (solid line), during one period of tail oscillation, is plotted against predicted kinematic behavior (dotted line) for each of two models, designated Tail 1 and Tail 2 respectively. A top view of the centerline of each tail is shown. FIGS. 7 A-C show Tail 1 and FIGS. 8 A-C. Show Tail 2. (A schematic representation of the actual prototype tail is shown in outline.)

Tail 1 is made of a single very soft polyurethane material with hardness shore 10A. Tail 1 has a low aspect ratio caudal fin with a span of 0.1 m, and cord of 0.047 m. The second prototype, or Tail 2, is made of two materials with different physical properties. The thicker part of Tail 2, towards the belly and front of the prototype, is made with a soft shore 10A polyurethane. The rest of the tail, towards the peduncle, is made with a stiffer shore 35A polyurethane. Both prototypes mimic the same fish kinematics. An advantage of adding a stiffer section in Tail 2 is that smaller tail cross-sections are required in order to achieve comparable deflections as Tail 1. This feature makes Tail 2 more streamlined and less susceptible to drag, which is expected to aid in locomotion performance. Tail 2 has a high aspect ratio caudal fin with a span of 0.1 m, and an average cord of 0.015 m. Caudal fins in the prototypes are made of a stiff shore 60D polyurethane. Both prototype tails are 0.18 m long without the front part of the body. The prototypes use the same frontal section and have an overall length of 0.3 m. The next section describes the procedure used to measure the kinematics and the performance achieved by these prototypes.

Fish swimming frequency corresponds to reported values (Videler) and is matched by the prototype's driving frequency. The model in Eq. (10) was used for the Tail 1 data and the model in Eq. (16) for Tail 2 data.

Several observations can be made. First, both mathematical tail models match qualitatively the fish kinematic data. Good agreement is achieved specially at the tip of the tails. However, the biggest matching errors occur at the sections just before the tail tops. These sections influence the angle of attack of the prototype's caudal fins so they affect the desired performance (Barrett). It can be observed as well that the model from Eq. (10) (Tail 1) does a better overall job than the model from Eq. (16) (Tail 2). This can be attributed to the assumptions and simplifications made above. In particular, values for estimated natural frequencies should be improved. Next, the desired and predicted kinematic behavior is compared to experimental data.

Experiments

To measure the kinematics achieved by the prototypes, experiments in a liquid environment were made. The experimental setup, consists of a 2.4 m×0.6 m×0.6 m acrylic tank filled with tap water where prototypes have sufficient space to move without disturbances from boundary effects. Experiments to identify kinematic behavior focused on the tail deflections achieved by the prototypes. For this, each prototype was placed in the middle of the tank, held in place, and actuated while a camera recorded top views of its motions. This was done for simplicity and the effect in the results is that amplitudes of oscillation are slightly larger as compared to free swimming (the resistive term in Eq. (2) diminishes as U decreases since U and V have opposite signs (Lighthill)). FIGS. 7 A-C and 8 A-C show schematical representations of still frames from a video image during a period of oscillation for Tail 1 and Tail 2 respectively. Desired (solid line) and predicted (dotted line) kinematics are superimposed in each still frame.

The agreement between predicted kinematics and actual kinematics depends on the accuracy of the models used. Eqs. (10) and (16) approximate the behavior of compliant beams with fish tail-like geometries but their accuracy depends on several key parameters. In order to simplify the models, resistive forces where underestimated. These forces arise from interaction with liquid environments and depend on the normal component of relative velocity between a tail and the liquid environment. Therefore, predictions of both models deteriorate towards the tail tips where speed of lateral motion is greater. In addition, values for the natural frequencies used had to be estimated. As a result, the "complexity" of the deformations in the robot prototype is not always well captured by the mathematical models. The effects that these simplifications have on the deflection predictions can be seen in FIGS. 7 A-C, 8 A-C. The agreement between actual (outline) or predicted (solid line) and desired deflections (dotted line) depends on how well a model such as the ones in Eqs. (10) and (16), can fit living fish kinematic data given by Eq. (1). Overall, it should be emphasized that although the tail mechanisms do not imitate perfectly the desired kinematics, they achieve qualitatively the required behavior.

Finally, an important reason to imitate fish-like kinematic behavior is to achieve fish-like swimming performance. Experiments were also made to measure the performance achieved by the tail prototypes. The testing set up described above has a stage supported by air bearings and fitted with a load cell where prototypes can be attached. As a prototype is actuated, the stage forces a straight trajectory which facilitates velocity and thrust measurements. The corresponding swimming performance of both prototypes was compared with real fish published performance and performance of current robotic fish. The maximum swimming velocity achieved was 0.32 m/s (1.1 BL/s) (Body Length/s), with Tail 2 actuated with a driving frequency of 3.5 Hz. The maximum thrust achieved was of 0.2 N, registered with Tail 1 at a driving frequency of 3.5 Hz. A peak in performance was expected around 3.5 Hz since, as mentioned earlier, the prototypes imitate fish kinematics with this body wave frequency. For comparison, swimming velocity data for current robotic fish and measured fish swimming was also noted. Anderson's vorticity control unmanned undersea vehicle ("VCUUV") achieves a maximum velocity of 1.2 m/s (0.61 BL/s) (Anderson). Kumph's robotic pike achieves a maximum velocity of 0.09 m/s (0.1 BL/s) (Kumph). Yu's carangiform swimmer achieves a maximum velocity of 0.32 m/s (0.8 BL/s) [Yu]. *Pollachius Virens* can swim at speeds of up to 1.05 m/s (2.9 BL/s) (Videler).

The prototypes' performance is still only ⅓ of the performance of real fish of comparable size. However, it is clear that performance is in the same order of magnitude as current robotic fish.

The design approach disclosed herein eliminates important limitations of known approaches with the use of compliant mechanisms whose dominant modes of vibration match the desired kinematics for locomotion in a given environment. Mechanisms achieved are simpler and more mechanically robust than known designs. A design methodology to accomplish biomimetic swimming kinematics was discussed. Two models for compliant mechanism bodies were derived and their use to identify actuator, material, and geometrical characteristics of the required mechanisms was explained. The design and fabrication techniques of mechanisms implementing these ideas was also described. The experiments to verify the validity of the design methodology were carried through and it was found that important features of fish-swimming kinematics can be captured qualitatively by compliant mechanisms. The resulting mechanism swimming performance was still ⅓ of the real fish performance but comparable to the performance of current robotic fish. As a result, this study demonstrates that the compliant mechanism approach to Biomimetic locomotion has significant advantages since mechanisms are simpler and more robust than traditional mechanisms used for biomimetic robots and performance achieved is comparable.

Figure 9:
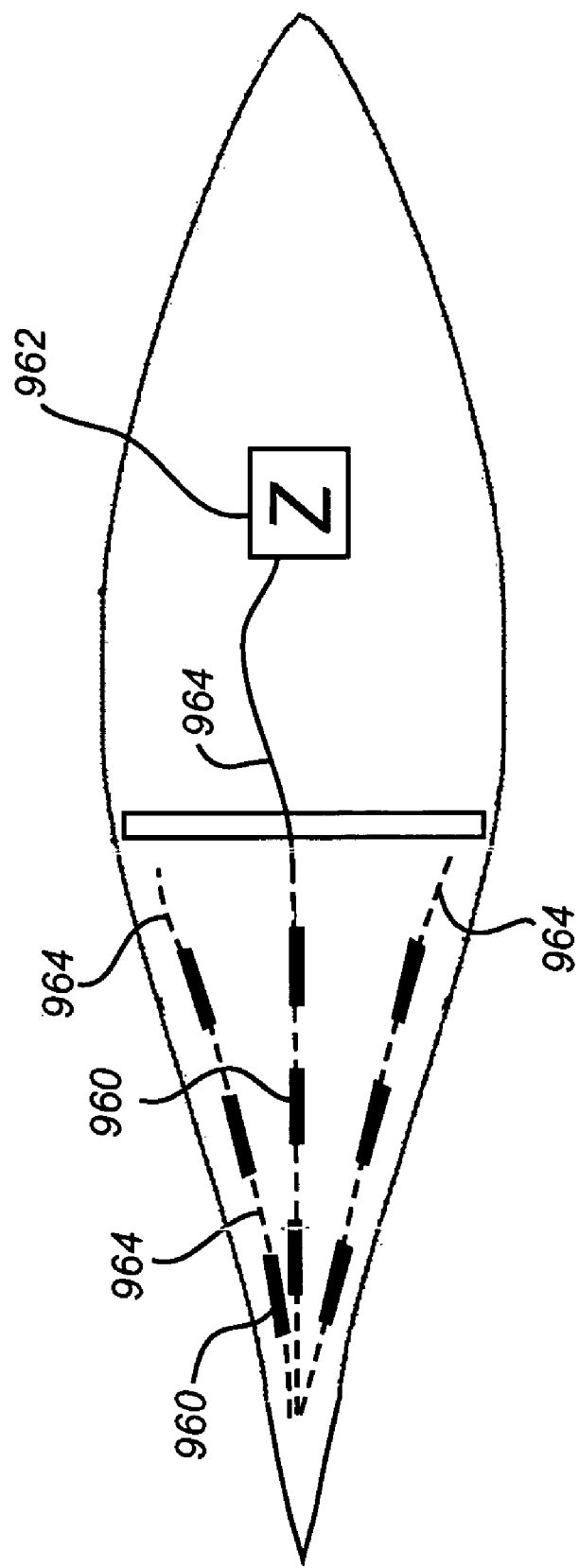
FIG. 9 Is a schematic representation of an embodiment of an invention hereof having active elements incorporated into the tail section.

For a given liquid environment, there exists a frequency of body oscillation that achieves good propulsion features, as described above. The compliant bodies are designed so that their first natural mode, or the mode that most resembles the desired kinematics, has a natural frequency matching such a frequency, which saves energy. If the environment properties change, the value of this optimal frequency will change also. Similarly, if the robot is used in more than one liquid, there will be a different frequency for each liquid. FIG. 9 shows schematically an apparatus that can have differing natural frequencies, due to active elements 960 that make up parts of the apparatus. A passive electrical circuit 962, for instance connectors 964, a basic resistance, or resistance, inductance, capacitance circuit, can be used to control the effective stiffness of piezo-electric sheets or other shapes of piezoelectric materials, embedded within the flexible tail section. This allows tuning the natural frequency of the flexible body to the required body oscillation frequency.

In general, materials that can be used to adjust the natural frequency are known as smart materials. Smart (Active) materials can be used for actuation or to control material properties (stiffness) of the tail. Smart materials can change shape as a response to electric, magnetic, or ion diffusion inputs. Some examples include: ceramics (electrostrictive, and piezoelectric), polymers (electrostrictive, electrostatic, piezoelectric, ferroelectric, and ionic activated), and some alloys (shape memory alloys). Depending on the application, any suitable smart material can be used within the bounds of inventions disclosed herein.

While the foregoing has assured that the robot will mimic swimming motion of a living aquatic animal, that need not be the case. There may be other swimming motions that can be described by an equation analogous to but different from Eq. (1), which may provide favorable kinematics, energy efficiency, etc. These motions may be life-like, but may not resemble any known living animal. They may mimic an extinct animal. Or, they may be entirely not life-like, yet still be valuable.

Furthermore, the foregoing has considered generally that there would be only one actuator to excite the natural modes of the flexible body. This is thought generally to be the most efficient, and robust and simplest implementation. Thus, there is a primary actuator that is responsible for setting the natural modes of the flexible portion into motion. Other actuators have been mentioned, in particular to operate the flippers. However, these actuators operate slowly, and are not intended to excite any natural modes of vibration of the flexible portion of the robot. It is conceivable that for some desired vibration kinematics, it is advantageous to use two or more actuators, each operating differently to excite different natural modes, located in different lacerations. For instance, if the robot is particularly large, there might be an actuator located near to the middle of the robot (from leading to trailing edge) and another closer to the trailing edge. Or, there may be actuators designed to excite widely different natural modes, or modes having frequencies that are so close that they can not both be excited by the same actuator. These too are contemplated as inventions hereof. The important factor is that the actuators are used to excite vibrational modes of the flexible portions of the robot, rather than to direct position of an element of the robot, such as a flipper or tail, or artificial propulsive device, such as a propeller.

Partial Summary

Thus, this document discloses many related inventions.

Inventions disclosed and described herein include a mechanical device for motion through a liquid, comprising: an actuator; and a flexible portion. The flexible portion is coupled to the actuator such that modes of vibration of the flexible portion are excited when the actuator is energized. The flexible portion also has a natural frequency such that when the actuator is energized, the flexible portion vibrates at that natural frequency, and in a manner that mimics kinematics of a living aquatic animal.

The flexible portion may be coupled to another portion that is less flexible. The less flexible portion is typically a head portion, located at the leading edge of the direction of motion, with the flexible portion being located at a trailing edge of the device along the direction of motion when the actuator is energized, as a tail. However, there may be two flexible portions, one at a leading, and one at a trailing edge.

According to one embodiment, the flexible portion is tapered, but it may also be uniform and equal in cross-section.

With yet another embodiment, the flexible portion has a material distribution that is homogeneous along its length, although it may also be non-homogeneous, for instance, with a first material composition in a first region and a second material composition in a second region.

According to a useful embodiment, the actuator is located adjacent the first portion and the flexible portion comprises: a body portion of flexible material; and within the flexible portion, a relatively stiff plate spaced away from the actuator and coupled to the flexible material between the plate and the actuator. A transmission couples the plate to the actuator, such that if the actuator is energized, the plate moves and the flexible portion vibrates.

For an advantageous embodiment, the transmission comprises a pair of inextensible cables. The actuator in such an embodiment may be configured to provide a harmonically varying tension on the cables.

In a typical embodiment, the plate is configured to provide a moment upon actuation. The actuator may advantageously be a servo motor.

It is useful if the flexible portion terminates in a fin, coupled to the plate. The flexible portion may be of a polymer, such as polyurethane.

According to a somewhat specialized embodiment of an invention hereof, the aquatic animal comprises an animal that is described by a kinematic model of body deformation of a traveling wave that increases in amplitude from a head portion to a flexible tail portion, given by, $$y_b(x_b, t) = (c_1 x_b + c_2 x_b^2)[\sin(K x_b)\cos(\omega t) + \cos(K x_b)\sin(\omega t)], \quad (1)$$

where $y_b$ is the lateral displacement of the animal body at a distance $x_b$ from an anterior point of the head portion as a function of time, t, and the values of $c_1$, the linear wave amplitude envelope, $c_2$, the quadratic wave amplitude envelope, K, the body wave number and ω the body wave frequency, are known for the animal. This is a model of a carangiform fish, of which a tuna is an example. Another model may represent and anguilliform fish. Any living or extinct swimming animal is a candidate for mimicking. In fact, the model to be mimicked need not represent an animal that has ever lived, but can be any other useful kinematics that can be mimicked by vibrational modes.

For one embodiment, the device further comprises at least one movable flipper element, characterized by an angle of attack relative to the flexible portion, coupled to the flexible portion such that the angle of attack can be changed. It may be coupled to the flexible portion through a joint, which may be a rotational joint, capable of rotating about any of three axes. The flipper element may be coupled to the flexible portion through an actuator configured to rotate the flipper element.

Important embodiments of inventions hereof may have radio controllable actuators, including the actuator which, when energized, causes the flexible portion to vibrate in a mode that mimics desired kinematics, and any actuators used to actuate flippers, or other movable elements.

Still another embodiment of inventions hereof may further have, coupled to the flexible portion, at least one element that changes its shape in response to at least one stimulus. The element that changes shape may comprise an element that is activated by a stimulus selected from the group consisting of: electrical, magnetic and ion diffusion. Such elements include but are not limited to: piezoelectric, electrorestrictive, electrostatic, ferroelectric or ionic activated elements. They may be composed of shape memory alloy, ceramic, or polymer.

A related important embodiment is a mechanical device for motion through a liquid with kinematics that mimic a living aquatic animal, comprising: a relatively rigid head portion; a primary actuator; and a flexible portion. The flexible portion is: coupled to the head portion; coupled to the actuator to vibrate when the actuator is energized; possessed of a natural frequency such that when the actuator is energized, the flexible portion vibrates at that frequency in a manner that mimics the living aquatic animal; and free from coupling to any other actuators that cause vibration at a natural frequency of the flexible portion.

Also an invention hereof is a mechanical device for motion through a liquid with kinematics that mimic a desired kinematics, comprising: an actuator; and a flexible portion. The flexible portion is coupled to the actuator such that modes of vibration of the flexible portion are excited when the actuator is energized; and has a natural frequency such that when the actuator is energized, the flexible portion vibrates at that natural frequency, and in a manner that mimics the desired kinematics.

Still another invention disclosed herein is a method for moving a device through a liquid environment comprising the steps of: providing a mechanical device comprising: an actuator; and a flexible portion. The flexible portion is coupled to the actuator such that natural modes of vibration of the flexible portion are excited when the actuator is energized; and has a natural frequency such that when the actuator is energized, the flexible portion vibrates at that natural frequency, and in a manner that mimics kinematics of a living aquatic animal. The method further comprises the step of energizing the actuator so that the flexible portion vibrates at the natural frequency in a manner that mimics kinematics of a living aquatic animal.

Further, the device may be of any of the types described above.

A related invention hereof is a method for selecting design properties for geometry, material and actuator of a mechanical device for motion through a liquid with kinematics that mimic swimming motion of a living aquatic animal, the device comprising: an actuator; and a flexible portion. The flexible portion: is coupled to the actuator such that its modes of vibration of the flexible portion are excited when the actuator is energized; and has a natural frequency such that when the actuator is energized, the flexible portion vibrates at that natural frequency, and in a manner that mimics kinematics of the living aquatic animal. The method of selecting design properties comprises the steps of: identifying a model of the living aquatic animal whose kinematics are to be mimicked; identify a model of the mechanical device, in terms of its actuator properties, its material properties and its geometry properties; and fitting the living aquatic animal model to the device model by selecting actuator properties, material properties and geometry properties that minimize any difference between the living animal model and the device model.

With such a method the actuator properties may be selected from the group consisting of M (actuation moment), a (location of application of actuation moment) and $\Omega$ (actuation frequency). The material properties may be selected from the group consisting of E (modulus of elasticity of the flexible portion) and $\rho$ density of the flexible portion. The geometry properties may be selected from the group consisting of A (cross-sectional area), I (second moment of cross sectional area of the flexible portion) and l (length of flexible portion).

According to any relevant method discussed above, the step of fitting the living aquatic animal model to the device model may comprise the step of applying a least squares method, or any other appropriate curve or data fitting method.

Many techniques and aspects of the inventions have been described herein. The person skilled in the art will understand that many of these techniques can be used with other disclosed techniques, even if they have not been specifically described in use together. For instance, the method of selecting properties of actuator, material and geometry can be performed to mimic any type of kinematics, whether for a living animal, an imaginary or extinct animal, or a non-animal. The method of moving a device through a fluid can be used with any device disclosed herein. The actuators may be radio controlled, or programmably controlled, or controlled by tether and console. The device may have additional movable elements, such as flippers, and fins, and other appendages. The moving animal might also be a snake moving along on solid material, rather than swimming.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

REFERENCES

D. S. Barrett, *Propulsive efficiency of a flexible hull underwater vehicle*. PhD thesis, Massachusetts Institute of Technology, 1996.

J. M. Anderson, *Vorticity control for efficient propulsion*. PhD thesis, Massachusetts Institute of Technology, 1996.

J. M. Kumph, *The design of a free swimming robot pike*. B. S. thesis, Massachusetts Institute of Technology, 1996.

K. M. Mcletchie, *Drag reduction of an elastic fish model*. B. S. thesis, Massachusetts Institute of Technology, 2002.

N. Davidson, N. Julian, www/me.berkeley.edu/hel/calibot.htm

R. Blickhan, J.-Y. Cheng. Energy storage by elastic mechanisms in the tail of large swimmers—a re-evaluation. *Journal of Theoretical Biology*, 168:1994, 315-321.

K. A. Harper, M. D. Berkemeier, S. Grace, Decreasing the energy costs of swimming robots through passive elastic elements, *Proc. IEEE Int. Conf. On Robotics and Automation*, Albuquerque, N. Mex., 1997, 1839-1844.

J. Lighthill, *Mathematical Biofluiddynamics* (Philadelfia, Pa.: Society for Industrial and Applied Mathematics, 1975).

J. J. Videler, *Fish swimming* (London: Chapman & Hall, 1993).

H. P. W. Gottlieb, Comments on Vibrations of Non-uniform Beams and Rods, *Journal of Sound and Vibration* 195, 1996, 139-140.

S. Abrate, Vibration of Non-Uniform Rods and Beams, *Journal Sound and Vibration,* 185(4), 1995, 703-716.

S. Timoshenko, D. H. Young, W. Weaver Jr, *Vibration problems in engineering* (John Wiley & Sons, 1974).

J. G. Cham, B. L. Pruitt, M. R. Cutkosky, M. Binnard, L. E. Weiss, G. Neplotnik, Layered manufacturing with embedded components: Process planning issues, *Proc. Of ASME Design Engineering Technical Conference*, Las Vegas, Nev., 1999.

What is claimed is:

1. A mechanical device for motion through a liquid, comprising:
   a. an actuator; and
   b. a continuous, solid, transmission element-free flexible portion that:
      i. is coupled to the actuator such that vibration of the flexible portion that mimics swimming kinematics of a living aquatic animal is excited when the actuator is energized; and
      ii. is specifically designed such that when the actuator is energized, the continuous flexible portion vibrates in a manner that mimics swimming kinematics of a living aquatic animal.

2. The device of claim 1, further comprising, coupled to the flexible portion, a first portion.

3. The device of claim 1, the first portion comprising a head portion, at the leading edge of motion in which the device moves when the actuator is energized to cause the flexible portion to vibrate.

4. The device of claim 1, the flexible portion comprising a head portion, at the leading edge of motion in which the device moves when the actuator is energized to cause the flexible portion to vibrate.

5. The device of claim 1, the flexible portion comprising a tapered section.

6. The device of claim 1, the flexible portion comprising a generally uniform, cross-section.

7. The device of claim 2, the first portion comprising a relatively rigid portion.

8. The device of claim 1, the flexible portion comprising a homogeneous material distribution specifically designed so that vibration of the flexible portion that mimics swimming kinematics of a living aquatic animal is excited by the actuator.

9. The device of claim 1, the flexible portion comprising a variable cross-section.

10. The device of claim 1, the flexible portion comprising a non-homogeneous material distribution specifically designed so that vibration of the flexible portion that mimics swimming kinematics of a living aquatic animal is excited by the actuator.

11. The device of claim 10, the flexible portion comprising a material distribution having at least two regions of different material composition.

12. The device of claim 1, the actuator being located adjacent the first portion, the flexible portion comprising:
   a. a body portion of flexible material;
   b. within the flexible portion, a relatively stiff section spaced away from the actuator and coupled to the flexible material between the stiff section and the actuator; and
   c. a transmission that couples the stiff section to the actuator, such that if the actuator is energized, the stiff section moves and the flexible portion vibrates.

13. The device of claim 12, the transmission comprising a pair of inextensible cables.

14. The device of claim 12, the actuator configured to provide a harmonically varying tension on the cables.

15. The device of claim 12, the stiff section configured to provide at least one of a moment and a force upon actuation.

16. The device of claim 1, the actuator comprising a servo motor.

17. The device of claim 12, the flexible portion further comprising, coupled to the stiff section, a terminal fin.

18. The device of claim 12, the flexible material comprising a flexible polymer.

19. The device of claim 18, the flexible polymer comprising polyurethane.

20. The device of claim 1, the aquatic animal comprising an animal that is described by a kinematic model of body deformation of a traveling wave that increases in amplitude from a head portion to a flexible tail portion, given by, $$y_b(x_b, t) = (c_1 x_b + c_2 x_b^2)[\sin(Kx_b)\cos(\omega t) + \cos(Kx_b)\sin(\omega t)] \quad (1)$$

where $y_b$ is the lateral displacement of the animal body at a distance $x_b$ from an anterior point of the head portion as a function of time, t, and the values of $c_1$, the linear wave amplitude envelope, $c_2$, the quadratic wave amplitude envelope, K, the body wave number and $\omega$, the body wave frequency, are known for the animal.

21. The device of claim 1, the aquatic animal comprising a carangiform fish.

22. The device of claim 1, the aquatic animal comprising a anguilliform fish.

23. The device of claim 1, the aquatic animal comprising a known swimming animal.

24. The device of claim 1, further comprising at least one movable flipper element, characterized by an angle of attack relative to the flexible portion, coupled to the flexible portion such that the angle of attack can be changed.

25. The device of claim 24, the flipper element being coupled to the flexible portion through a joint.

26. The device of claim 24, the flipper element being coupled to the flexible portion through an actuator configured to rotate the flipper element.

27. The device of claim 1, the actuator that excites vibration comprising a radio controllable actuator.

28. The device of claim 26, the flipper element actuator comprising a radio controllable actuator.

29. The device of claim 1, the flexible portion further comprising, at least one element that changes from a first shape, with which a first natural frequency is associated, to a second shape, with which a second different natural frequency is associated, in response to at least one stimulus.

30. The device of claim 29, the element that changes shape comprising an element that is activated by a stimulus selected from the group consisting of: electrical, magnetic and ion diffusion.

31. The device of claim 29, the element that changes shape comprising a piezoelectric element.

32. The device of claim 29, the element that changes shape comprising an electrorestrictive element.

33. The device of claim 29, the element that changes shape comprising an electrostatic element.

34. The device of claim 29, the element that changes shape comprising a ferroelectric element.

35. The device of claim 29, the element that changes shape comprising an ionic activated element.

36. The device of claim 29, the element that changes shape comprising a shape memory alloy.

37. The device of claim 29, the element that changes shape comprising a ceramic.

38. The device of claim 29, the element that changes shape comprising a polymer.

39. A mechanical device for motion through a liquid with kinematics that mimic a swimming living aquatic animal, comprising:
  a. a relatively rigid head portion;
  b. a primary actuator; and
  c. a continuous, solid, transmission element-free, flexible portion that is:
    i. coupled to the head portion;
    ii. coupled to the primary actuator to vibrate when the actuator is energized;
    iii. subject to vibration, that mimics swimming kinematics of a living aquatic animal, such that when the actuator is energized and the vibration is excited, the flexible portion vibrates in a manner that mimics the swimming living aquatic animal; and
    iv. free from coupling to any other actuators that excites vibration of the flexible portion.

40. A method for moving a device through a liquid environment comprising the steps of:
  a. providing a mechanical device comprising:
    i. an actuator; and
    ii. a continuous, solid, transmission element-free flexible portion that:
      A. is coupled to the actuator such that vibration of the flexible portion that mimics swimming kinematics of a living aquatic animal is excited when the actuator is energized; and
      B. is specifically designed such that when the actuator is energized, the flexible portion vibrates in a manner that mimics swimming kinematics of a living aquatic animal; and
  b. energizing the actuator so that the flexible portion vibrates in a manner that mimics swimming kinematics of a living aquatic animal.

41. A method for selecting design properties for geometry, material and actuator of a mechanical device for motion through a liquid with kinematics that mimic swimming motion of a living aquatic animal, the device comprising:
  a. an actuator; and
  b. a continuous, solid, transmission element-free flexible portion that:
    i. is coupled to the actuator such that vibration of the flexible portion, that mimics swimming kinematics of a living aquatic animal, is excited when the actuator is energized; and
    ii. is specifically designed such that when the actuator is energized the flexible portion vibrates in a manner that mimics swimming kinematics of the living aquatic animal;
  wherein the method of selecting design properties comprises the steps of:
    a. identifying a model of the living aquatic animal whose swimming kinematics are to be mimicked;
    b. identifying a model of the mechanical device, in terms of its actuator properties, its material properties and its geometry properties; and
    c. fitting the living aquatic animal model to the device model by selecting actuator properties, material properties and geometry properties that minimize any difference between motions described by the living animal model and motions described by the device model.

42. The method of claim 41, the actuator properties being selected from the group consisting of M (actuation moment), a (location of application of actuation moment) and Ω (actuation frequency).

43. The method of claim 41, the material properties being selected from the group consisting of E (modulus of elasticity of the flexible portion) and ρ (density of the flexible portion).

44. The method of claim 41, the geometry properties being selected from the group consisting of A (cross-sectional area), I (second moment of cross sectional area of the flexible portion) and l (length of tail).

45. The method of claim 41, the step of fitting the living aquatic animal model to the device model comprising the step of applying a least squares method.

46. The method of claim 41, the living aquatic model comprising a model of a carangiform fish.

47. The method of claim 41, the living aquatic model comprising a model of an anguilliform fish.

48. A mechanical device for motion through a liquid with kinematics that mimic a desired kinematics comprising:
  a. an actuator; and
  b. a continuous, solid, transmission element-free flexible portion that:
    i. is coupled to the actuator such that vibration of the flexible portion that mimics the desired kinematics is excited when the actuator is energized; and
    ii. is specifically designed such that when the actuator is energized, the flexible portion vibrates, in a manner that mimics the desired kinematics.

* * * * *